(12) United States Patent
Björkengren (10) Patent No.: US 11,974,133 B2
(45) Date of Patent: *Apr. 30, 2024

(54) METHOD AND SYSTEM FOR PREVENTING A PHYSICAL LAYER RELAY ATTACK

(71) Applicant: Volvo Car Corporation, Gothenburg (SE)

(72) Inventor: Ulf Björkengren, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,468

(22) Filed: Nov. 9, 2022

(65) Prior Publication Data
US 2023/0074878 A1    Mar. 9, 2023

Related U.S. Application Data

(63) Continuation of application No. 16/935,299, filed on Jul. 22, 2020, now Pat. No. 11,528,612, which is a
(Continued)

(30) Foreign Application Priority Data

Jun. 21, 2017 (EP) ..................................... 17177018

(51) Int. Cl.
*H04W 12/12* (2021.01)
*B60R 25/20* (2013.01)
(Continued)

(52) U.S. Cl.
CPC ......... *H04W 12/12* (2013.01); *B60R 25/2072* (2013.01); *B60R 25/24* (2013.01);
(Continued)

(58) Field of Classification Search
CPC ... H04W 12/12; H04W 12/08; H04W 12/082; B60R 25/2072; B60R 25/24;
(Continued)

(56) References Cited

U.S. PATENT DOCUMENTS

2006/0083406 A1    4/2006  Ishimura et al.
2015/0184628 A1    7/2015  Fan
(Continued)

FOREIGN PATENT DOCUMENTS

CN    1727914 A    2/2006
CN    101931474 A    12/2010
(Continued)

OTHER PUBLICATIONS

Office Action/search report issued in the corresponding CN application 201810595023.

*Primary Examiner* — Nadeem Odeh
(74) *Attorney, Agent, or Firm* — Clements Bernard Walker; Christopher L. Bernard (57) ABSTRACT

There is provided a method and a system for authorizing a user device to send a request to a vehicle in order to prevent a physical layer relay attack. The system comprises a vehicle comprising an acoustic transducer and an RF transceiver and a user device comprising an acoustic transducer and an RF transceiver. The method relates to a signaling scheme using a combination of acoustic and RF signals for preventing a successful physical layer relay attack.

21 Claims, 5 Drawing Sheets

Related U.S. Application Data continuation of application No. 15/983,286, filed on May 18, 2018, now Pat. No. 10,759,383.

(51) Int. Cl.
| | |
|---|---|
| *B60R 25/24* | (2013.01) |
| *F02N 11/08* | (2006.01) |
| *G07C 9/00* | (2020.01) |
| *H04L 9/40* | (2022.01) |
| *H04W 12/08* | (2021.01) |
| *H04W 12/082* | (2021.01) |

(52) U.S. Cl.
CPC ...... *F02N 11/0807* (2013.01); *G07C 9/00174* (2013.01); *G07C 9/00182* (2013.01); *G07C 9/00309* (2013.01); *H04L 63/1466* (2013.01); *H04W 12/08* (2013.01); *H04W 12/082* (2021.01); *G07C 2009/00261* (2013.01); *G07C 2009/00555* (2013.01); *G07C 2009/00769* (2013.01); *G07C 2009/00801* (2013.01); *G07C 2209/63* (2013.01)

(58) Field of Classification Search
CPC ............ G07C 9/00174; G07C 9/00182; G07C 9/00309; G07C 2009/00261; G07C 2009/00555; G07C 2009/00769; G07C 2009/00801; G07C 2209/63; H04L 63/1466; H04L 63/08; H04L 63/0876; H04L 63/10; H04L 63/16; H04L 63/166; H04L 67/12; F02N 11/0807
See application file for complete search history.

(56) References Cited

U.S. PATENT DOCUMENTS

| | | |
|---|---|---|
| 2016/0302074 A1 | 10/2016 | Hekstra et al. |
| 2017/0190316 A1 | 7/2017 | Kim |

FOREIGN PATENT DOCUMENTS

| | | |
|---|---|---|
| EP | 3163925 A1 | 5/2017 |
| WO | 2016202592 A1 | 12/2016 |

METHOD AND SYSTEM FOR PREVENTING A PHYSICAL LAYER RELAY ATTACK

CROSS-REFERENCE TO RELATED APPLICATIONS

The present patent application/patent is a continuation (CON) of co-pending U.S. Ser. No. 16/935,299, filed on Jul. 22, 2020, and entitled "METHOD AND SYSTEM FOR PREVENTING A PHYSICAL LAYER RELAY ATTACK," which is a continuation (CON) of co-pending U.S. Ser. No. 15/983,286, filed on May 18, 2018, and entitled "METHOD AND SYSTEM FOR PREVENTING A PHYSICAL LAYER RELAY ATTACK," which claims the benefit of priority of co-pending EP17177018, filed on Jun. 21, 2017, and entitled "METHOD AND SYSTEM FOR PREVENTING A PHYSICAL LAYER RELAY ATTACK," the contents of all of which are incorporated in full by reference herein.

TECHNICAL FIELD

In general, the present invention relates to increased vehicle security and improved anti-theft functionality of a vehicle. In particular, the present invention relates to a system and a method for preventing a physical layer relay attack.

BACKGROUND

In modern vehicles, locking of the vehicle, activating the alarm and also other functions of the vehicle are controlled by a remote device.

The physical layer relay attack that is known to be used on existing key-less entry and start solutions is very hard to prevent as it is independent of communication protocols, authentication, and encryption.

In a typical relay attack, communication with both parties is initiated by the attacker who then merely relays messages between the two parties without manipulating them or even necessarily reading them.

By using position data to estimate motion of the smart phone, and then comparing this with the motion estimated by the smart phone by data from its motion sensors, it would become necessary for the attackers to also synchronize the motion of the "fake" smart phone in proximity of the car with the motion of the remote "original" smart phone. This should make the attacker process significantly more complex, and difficult to carry out in a unobtrusive way.

WO2016/202592 describes one such method using an authentication element where access to the vehicle is based on a location and movement of the authentication element. Such movement is difficult to replicate by a third party attempting a physical layer relay attack, and the vehicle security is thereby improved.

However, as mentioned in WO2016/202592, using the motion sensor data requires that the velocity of the authentication element in the first position measurement is known, which is not so easily obtained. Another well-known positioning method for electronic devices is to use a GPS device. However, for many applications, the accuracy of a GPS device may not be sufficient. Moreover, there are circumstances where a GPS device cannot be used due to a lack of reception, such as in a parking garage and in dense city environments.

Accordingly, it is desirable with improved solutions for preventing physical layer relay attacks.

SUMMARY

In view of above-mentioned and other drawbacks of the prior art, it is an object of the present invention to provide an improved method and system for preventing a physical layer relay attack.

According to a first aspect of the invention, there is provided a method for authorizing a user device to send a request to a vehicle. The vehicle comprises an acoustic transducer and an RF transceiver and the user device comprises an acoustic transducer and an RF transceiver. The method comprises: establishing a secure communication channel between the vehicle and the user device; activating the vehicle acoustic transducer to transmit an acoustic signal comprising a first unique ID, $ID_1$, and creating a time stamp $t_0$; receiving, in the vehicle, at least one reflected acoustic signal having been reflected in a corresponding at least one object and creating a time stamp $t_1$ upon reception; and for the at least one received reflected acoustic signal, determining a first time-of-flight $ToF_1$ as $ToF_1=t_1-t_0$. The method further comprises, in the user device, receiving and verifying the acoustic signal identity $ID_1$ transmitted by the vehicle and creating a time stamp $t_2$ upon reception; generating a response signal using a previously agreed upon method for creating a second unique ID, $ID_2$, based on the received signal identity $ID_1$; transmitting the response signal as an acoustic signal comprising $ID_2$ and creating a time stamp $t_3$ for the transmission event; determining a response delay time $t_D$ as $t_D=t_3-t_2$; and transmitting an RF signal comprising $t_D$ to the vehicle over the secure communication channel. The method further comprises, in the vehicle: receiving the response signal, verifying $ID_2$, and creating a time stamp $t_4$, receiving the RF signal comprising $t_D$, determining a second time-of-flight $ToF_2$ as $ToF_2=t_4-t_0-t_D$; and if a difference between $ToF_1$ and $ToF_2$ is below a predetermined threshold value $T_{max}$, authorizing the user device.

The user device is herein seen as a device carried by an operator or driver of the vehicle. The position of the user device in relation to the vehicle can thus be considered to be substantially the same as the position of the operator carrying the user device. The operator is typically a driver of the vehicle. However, the described method is equally applicable for a user device carried or transported by automated means, for example a parking robot or the like in an automated or semi-automated vehicle management system.

Authorizing the user device should in the present context be interpreted to mean that the vehicle has verified that the user device is located at a distance from the vehicle corresponding to the determined time-of-flight. However, it should be noted that the aforementioned authorization does not necessarily allow the user device to control vehicle functionality or that a request from the user device is granted. The vehicle may require that additional conditions are fulfilled before granting such a request. One such condition may for example be that the user device is not further away from the vehicle than a predetermined maximum distance. Failure to fulfill such additional conditions may lead to that the described authorization process must be repeated before a request can be granted, assuming all conditions are fulfilled. Accordingly, authorizing the user device should be interpreted in its broadest sense, meaning that the user device is allowed to continue communication with the vehicle. A request from the user device to the vehicle may for example be a request to unlock the vehicle and to de-activate any active alarm and theft prevention systems.

The acoustic transducer is a device, unit or module capable of both transmitting and receiving acoustic signals. Acoustic signals are assumed to comprise audible sound in the 20 to 20 kHz range as well as ultrasound. Ultrasound should in the present context be considered to comprise both signals in the near ultrasound range of 18-21 kHz, signals in the 40-50 kHz range, as well as signals having significantly higher frequencies. Likewise, the RF transceiver is a device, unit or module capable of transmitting and receiving RF signals.

The secure communication channel such as an RF communication channel may be established according to any method known to the skilled person, such as TLS (Transport Layer Security) or similar methods.

Moreover, the described times of flight $ToF_1$ and $ToF_2$ refer to round-trip times, where the round-trip time describes the time it takes for the acoustic signal to propagate from the vehicle to the user device/object and back to the vehicle. Dividing the round-trip time by two, and multiplying it with the propagation velocity gives the distance between the vehicle and the device/object.

The present invention is based on the realization that a physical layer relay attack can be prevented, or that the chance of a successful attack at least can be significantly reduced, by verifying that the first time of flight $ToF_1$, which is measured by the vehicle without any active involvement by the user device, corresponds to the second time of flight $ToF_2$, which is measured requiring active involvement by the user device.

Moreover, the response signal from the user device comprises $ID_2$ which is a unique identifier based on $ID_1$, and typically also on a shared secret that is not known by a potential attacker. Since $ID_2$ is created using a method and parameters which are predetermined and known to the vehicle, an expected correct $ID_2$ can be determined by the vehicle. Accordingly, the vehicle can verify that the received $ID_2$ correspond to the expected correct $ID_2$ determined in the vehicle.

Accordingly, to launch a successful attack, the equipment used to perform a physical layer relay attack must successfully guess or otherwise derive the delay time $t_D$ introduced by the user device while at the same time copying or otherwise replicating the response signal comprising $ID_2$. Alternatively, to launch a successful relay attack, the attackers need to be able to get sufficiently close to the original user device that the round-trip time $ToF_2$ does not become increased more than what is required for the vehicle verification of the difference between $ToF_1$ and $ToF_2$ to be accepted.

According to one embodiment of the invention, the steps of the method following after establishing a secure communication channel between the vehicle and the user device may advantageously be performed repeatedly. Thereby, the exchange of ID:s and the verification of time of flights, is performed repeatedly, thus requiring multiple verifications before authorizing the service request by the user device. The authorization may for example be repeated at predetermined time intervals, or the method may be repeated based on a request from the vehicle. The method may thus be performed repeatedly as a user device moves towards the vehicle, resulting in different times of flight.

According to one embodiment of the invention, the method may further comprise, if the difference between $ToF_1$ and $ToF_2$ is above a predetermined threshold value $T_{max}$, denying the authorization of the user device.

According to one embodiment of the invention, the method may further comprise: receiving a plurality of reflected signals having been reflected in a corresponding plurality of objects, creating a corresponding plurality of time stamps $t_{11}, \ldots, t_{1N}$ upon reception of each reflected signal; for each received reflected acoustic signal, determining a first time-of-flight $ToF_{11}, \ldots, ToF_{1N}$ as $ToF_{11}, \ldots, ToF_{1N}=t_{11}-t_0, \ldots, t_{1N}-t_0$; and if a difference between any one of $ToF_{11}, \ldots, ToF_{1N}$, and $ToF_2$ is below the predetermined threshold value $T_{max}$, authorizing the user device. Here, N denotes the number of reflected signals received by the vehicle. As a first approximation, it can be assumed that each reflected signal corresponds to one object. This means that the distance (i.e. time of flight) to a plurality of objects in the vicinity of the vehicle is detected, and if the distance to one of the objects correspond to the expected distance to the user device, the distance from the user device to the vehicle is verified. It is also possible that some of the reflected signals are secondary reflections, and various known signal processing methods may be used to discard such signals.

According to one embodiment of the invention, if an object is detected which is closer to the vehicle than the object which is authorized, the authorization is revoked. The distance to the user device can be determined based on $ToF_2$. In other words, if any one of $ToF_{11}, \ldots, ToF_{1N}$ is lower than $ToF_2$, the authorization of the user device is denied or revoked. The authorization of the user device will then require further verification cycles, where the user device distance to the vehicle must be verified to be closer than any other reflecting object.

According to one embodiment of the invention, the response delay time may be a random time within a predetermined range. The randomization of the response delay time increases the difficulty for an attacker to correctly estimate the response delay time required for achieving the authorization.

According to one embodiment of the invention, the previously agreed upon method for creating a second unique ID, $ID_2$, comprises using a predetermined algorithm, a secure key, a shared secret, or an algorithm and secret data exchanged over the secure communication channel. Thereby, the user device is capable of creating $ID_2$ which can be recreated by the vehicle, but require an attacker first to compromise the secure key or the secure communication channel before being able to recreate the $ID_2$.

According to one embodiment of the invention, establishing a secure communication channel may comprise broadcasting a Bluetooth signal from the vehicle. Thereby, the secure channel can be established automatically as soon as the user device is within communication range of the vehicle and detects the broadcast. It is also possible to establish the secure communications channel using other means, such as a WiFi connection or the like.

According to one embodiment of the invention, activating the vehicle acoustic transducer may be done based on a request from the user device. The request may for example be a request to unlock the vehicle. Hereby, the vehicle does not need to activate the acoustic transducer unless there is a specific request.

According to a second aspect of the invention, there is provided a system for authorizing a user device to send a request to a vehicle. The system comprises: a vehicle comprising an acoustic transducer and an RF transceiver; a user device comprising an acoustic transducer and an RF transceiver; and a vehicle control unit. The vehicle control unit is configured to: establish a secure communication channel (RF) between the vehicle and the user device; activate the vehicle acoustic transducer to transmit an acoustic signal comprising a first unique ID, $ID_1$, and creating a time stamp $t_0$; receive at least one reflected acoustic signal having been reflected in a corresponding at least one object and create a time stamp $t_1$ upon reception; and, for the at least one received reflected acoustic signal, determine a first time-of-flight $ToF_1$ as $ToF_1 = t_1 - t_0$.

The user device is configured to: receive and verify the acoustic signal identity $ID_1$ transmitted by the vehicle and create a time stamp $t_2$ upon reception; generate a response signal using a previously agreed upon method for creating a second unique ID, $ID_2$, based on the received signal identity $ID_1$; transmit the response signal as an acoustic signal comprising $ID_2$ and create a time stamp $t_3$ for the transmission event; determine a response delay time $t_D$ as $t_D = t_3 - t_2$; and transmit an RF signal comprising $t_D$ to the vehicle over the secure communication channel.

The vehicle control unit is further configured to: receive the response signal, verify $ID_2$, and create a time stamp $t_4$; receive the RF signal comprising to, determine a second time-of-flight $ToF_2$ as $ToF_2 = t_4 - t_0 - t_D$; and if a difference between $ToF_1$ and $ToF_2$ is below a predetermined threshold value $T_{max}$, the distance measurement between the user device and the vehicle can be verified and the user device can thereby be authorized. Thereby, a system is provided for authorizing a user device based on verified distance measurements which reduces the probability of a successful physical layer relay attack.

According to one embodiment of the invention, the vehicle may advantageously comprise one receiver arranged in each corner of the vehicle, wherein each receiver has a horizontal directional sensitivity of at least 270° and a vertical directional sensitivity of at least 180°. Thereby, a user device can be detected at any location surrounding the vehicle with the minimum amount of ultrasonic transducers in the vehicle.

According to one embodiment of the invention, the acoustic transducer in the vehicle may be part of a proximity detection system of the vehicle. Such a proximity detection system is for example used for parking assist features of the vehicle. Thereby, by utilizing a system which is typically already present in vehicles, the described system can be implemented with a minimum of modification of already existing vehicles.

According to one embodiment of the invention, the user device may be a car key, a key fob or a smartphone. In principle, any device having the described communication capabilities can be configured to be a user device sending requests to the vehicle.

According to one embodiment of the invention, the acoustic transducer in the user device and/or in the vehicle comprises a separate transmitter module and receiver module. Taking the example where the user device is a smartphone, the acoustic transducer may comprise both the speaker and the microphone units of the smartphone. Accordingly, the acoustic transducer may comprise an acoustic transmitter capable of transmitting signals in the ultrasound or near ultrasound range. Moreover, the vehicle may be equipped to be able to receive the response message with identity $ID_2$ by two different acoustic transducers, in the vehicle, thereby being able to calculate the distance between each of the two receivers and the user device, and thus being able to triangulate the position of the user device in relation to the car.

Additional effects and features of the second aspect of the invention are largely analogous to those described above in connection with the first aspect of the invention.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

In the following detailed description, various embodiments of the invention will be described with reference to an acoustic transducer in the form of an ultrasound transducer, and the transmitted signals will similarly be discussed as ultrasonic signals. However, the same general principles are applicable for acoustic signals in the audible range.

Figure 1:
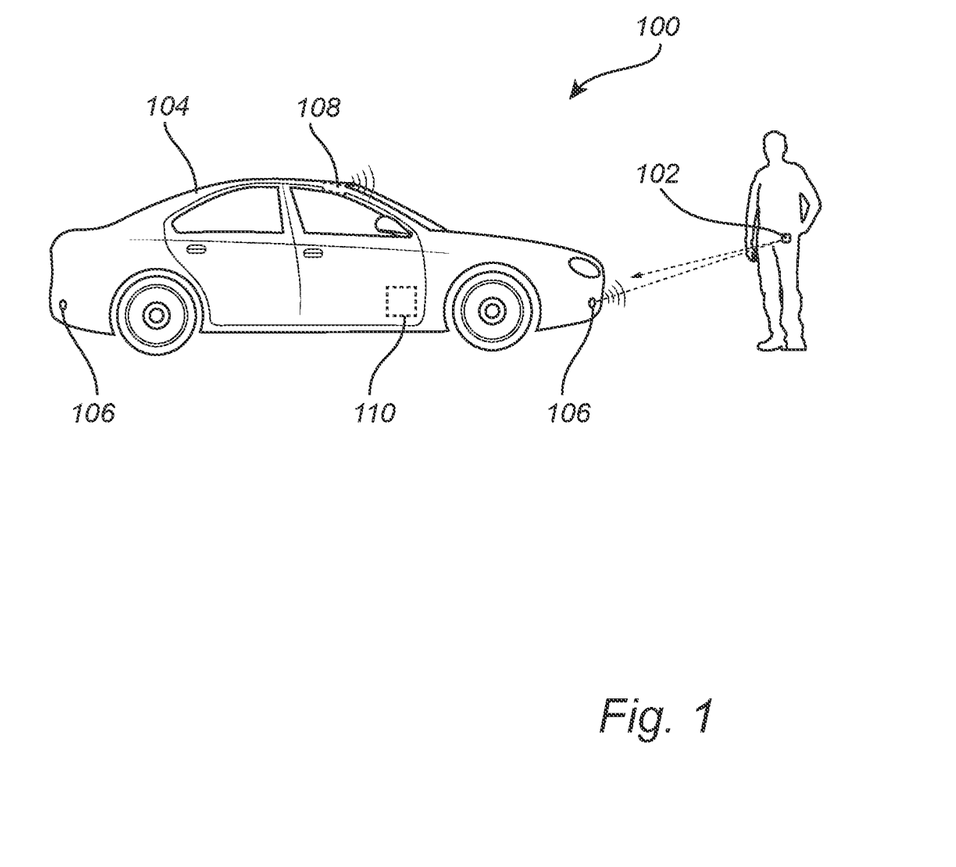
FIG. 1 schematically illustrates a vehicle comprising a system according to an embodiment of the present invention.
Figure 2:
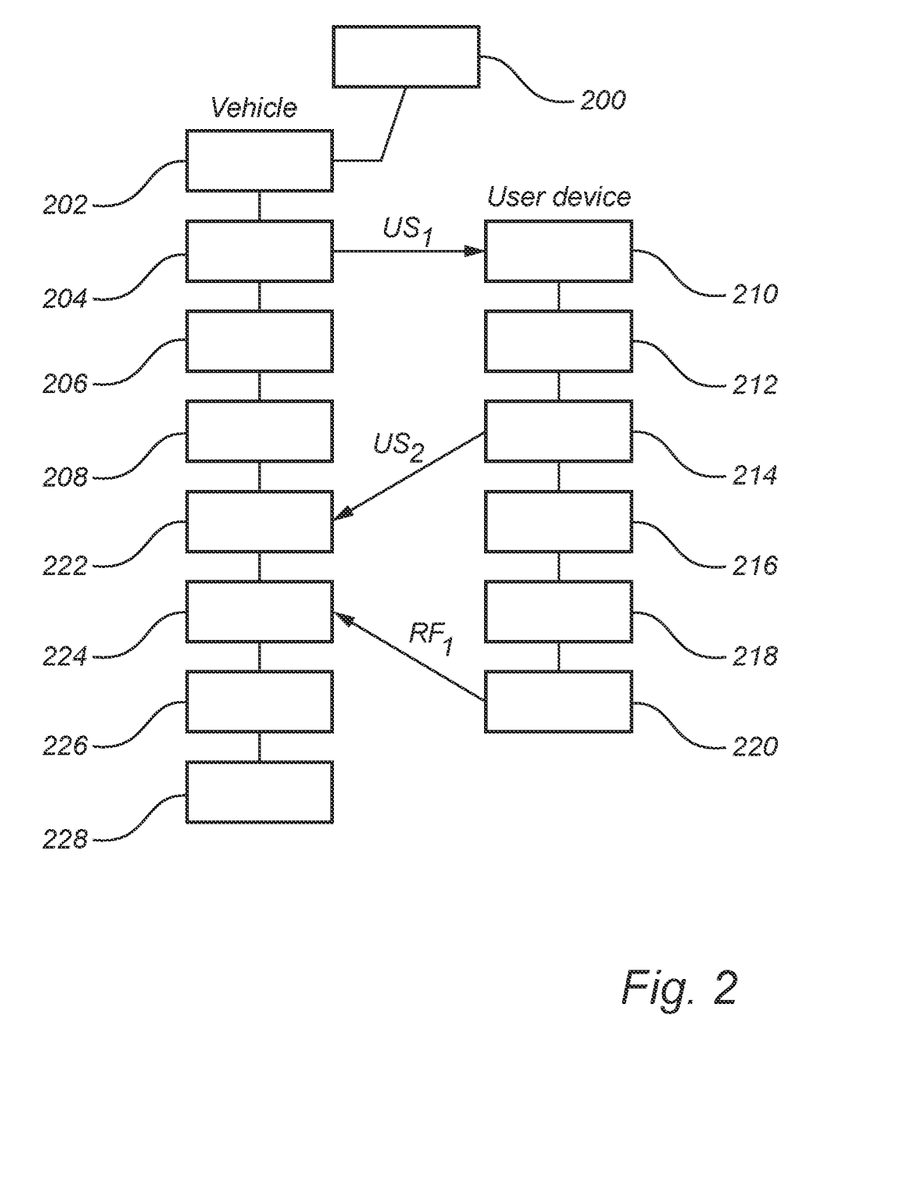
FIG. 2 is a flow chart outlining the general steps of a method according to an embodiment of the invention.

Various embodiments of the invention will be described with reference to FIG. 1 schematically illustrating a system 100 for authorizing a user device 102 to send a request to a vehicle 104, and to the flow chart of FIG. 2 outlining the general steps of a method for authorizing a user device 102 according to an embodiment of the invention.

The system 100 of FIG. 1 comprises a vehicle 104 comprising a plurality of ultrasound transducers 106 and an RF transceiver 108. The method is in principle applicable for a vehicle 104 comprising only one ultrasound transducer 106. However, for increased convenience, the vehicle 104 preferable comprises a plurality of ultrasound transducers 106. The vehicle may for example comprise one ultrasound transducer 106 arranged in each corner of the vehicle, wherein each transducer 106 has a horizontal directional sensitivity of at least 270° and a vertical directional sensitivity of at least 180°. By using a plurality of ultrasound transducers 106 in the vehicle, it is possible to more accurately determine the location of objects in the vicinity of the vehicle. The ultrasound transducer 106 is herein referred to as a single unit, even though the ultrasound transducer 106 equally well may comprise separate transmitter and receiver units. The user device 102 also comprises an ultrasound transducer and an RF transceiver.

Figure 3:
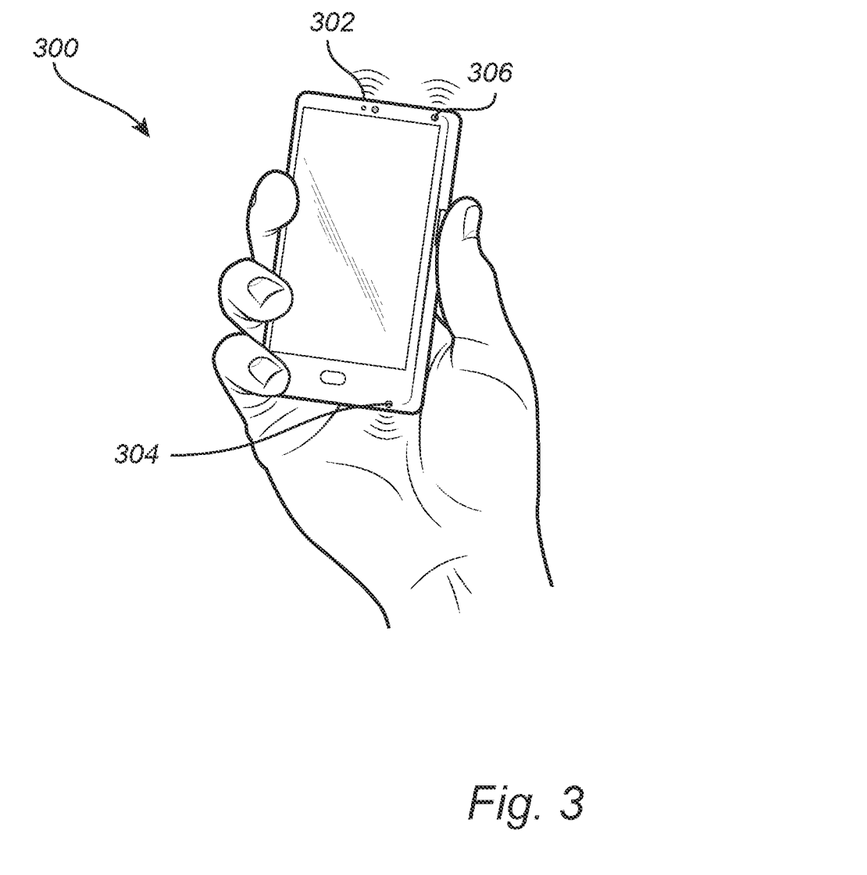
FIG. 3 schematically illustrates an example user device of a system according to an embodiment of the invention.

FIG. 3 schematically illustrates a user device 102 in the form of a smartphone 300. The illustrated smartphone 300 comprises an acoustic transmitter 302, an acoustic receiver 304 and an RF transceiver 306. The acoustic transmitter 302 and the acoustic receiver 304 is here illustrated as the speaker and the microphone of the smartphone, which may be configured to transmit and receive audible sound and/or ultrasound. However, the smartphone 300 may also be equipped with a single ultrasound transducer module. The RF transceiver 306 may for example be a Bluetooth module. The user device 104 may also be a key fob or the like as illustrated in FIG. 1.

The maximum distance between the vehicle 104 and the user device 102 for performing the authorization is in practice limited by the range of the ultrasound transducers 106 in the user device 102 and/or in the vehicle 104. The maximum allowable distance may also be set based on regulatory or standard-based requirements.

In applications where the user device 102 is a passive key, there may be requirements that the passive key can only unlock a vehicle 104 if the distance between the passive key and the vehicle 104 is lower than a predetermined distance. In one example, the key must be closer than 1.5 m from the vehicle 104 to authorize an unlock request. However, the described method may equally well be performed at longer distances as long as the described signals can be transmitted correctly.

The vehicle 104 further comprises a vehicle control unit 110. The control unit 110 may include a microprocessor, microcontroller, programmable digital signal processor or another programmable device. The control unit 110 may also, or instead, include an application specific integrated circuit, a programmable gate array or programmable array logic, a programmable logic device, or a digital signal processor. Where the control unit 110 includes a programmable device such as the microprocessor, microcontroller or programmable digital signal processor mentioned above, the processor may further include computer executable code that controls operation of the programmable device. Moreover, the control unit 110 may be a general purpose control unit 110 of the vehicle, or it may be a dedicated control unit 110 specifically configured to control the authorization system 100.

The vehicle control unit 110 is configured to control the system 100 to perform the method according to various embodiments of the invention.

First, a secure communication channel is established 200 between the vehicle 104 and the user device 102. The communication channel may be a Bluetooth channel established via known methods where the user device 102 is discovered based on a Bluetooth broadcast from the vehicle 104.

The next step comprises activating 202 the vehicle ultrasound transducer 106 to transmit 204 an ultrasound signal, $US_1$, comprising a first unique ID, $ID_1$, and creating a time stamp $t_0$. The ultrasound transducer 106 may be automatically activated once the communication channel is established, or it may be set to be always active, in which case the activation steps is the same as transmitting the signal $US_1$. However, it is also possible that activation of the ultrasound transducer 106 requires a request from the user device 102.

The unique ID, $ID_1$, is encoded in the ultrasound signal, where encoding may be performed using different well-known encoding schemes such as amplitude modulation, frequency modulation, or phase shift modulation. A time stamp $t_0$ is created in the vehicle 104 when the ultrasound signal $US_1$ is transmitted 204 from the vehicle 104. The method may comprise transmitting a plurality of ultrasound signals from the vehicle 104, in which case each signal has a unique ID and a corresponding unique time stamp.

Next, a reflected ultrasound signal $US_R$ having been reflected in a corresponding at least one object is received 206 in the vehicle 104 and a time stamp $t_1$ is created upon reception. It is further verified that the reflected ultrasound signal $US_R$ comprises $ID_1$. Accordingly, a first time-of-flight $ToF_1$ for the received reflected ultrasound signal $US_R$ can be determined 208 as $ToF_1=t_1-t_0$. In case of transmission of a plurality of ultrasound signals from the vehicle, the ID of the transmitted signals can be controlled to ensure that the received reflected signal corresponds to a transmitted signal having the expected ID.

Accordingly, the determined time-of-flight $ToF_1$ is proportional to the distance between the vehicle 104 and the object. To describe the general principle of the invention, it is assumed that only one reflected signal is received by the vehicle 104, and that the signal has been reflected by the user device 102 or by a carrier of the user device 102, meaning that the location of the object is assumed to correspond to the location of the user device 102.

The ultrasound signal $US_1$ transmitted by the vehicle is also received and verified 210 by the user device 102. The signal $US_1$ may be verified by confirming that $ID_1$ is a valid ID created by the vehicle 104. This can be done by the user device 102 receiving information of $ID_1$ from the vehicle 104 over the secure RF communication channel before the ultrasound signal is sent. Furthermore, a time stamp $t_2$ is created in the user device 102 upon reception of the signal $US_1$ in the user device 102.

Based on the received signal identity $ID_1$, a second unique ID, $ID_2$, is created using a previously agreed upon method, and a response signal $US_2$ is generated 212. The response signal $US_2$ is then transmitted 214 as an ultrasound signal comprising $ID_2$ and a time stamp $t_3$ is created 216 for the transmission event.

Based on the time stamp $t_2$ created upon reception of the signal $US_1$ and the time stamp $t_3$ created for the transmission event, a response delay time $t_D$ can be determined 218 as $t_D=t_3-t_2$. The response delay time thereby describes the time from reception of $US_1$ to transmission of $US_2$ by the user device 102. The response delay time may depend on latencies and processing times of the user device 102. The response delay time may also comprise a controllable or random delay to make it more difficult for an attacker to predict the response delay time. The random delay time may have a range from zero up to a maximum random delay time preferably being several times larger than the measurement inaccuracy of the overall system. Some system latencies are not controllable by the system and can thus not be included in the response delay time. However, these system latencies are typically negligible in comparison to the time of flight of the ultrasound signals.

Next, the user device 102 transmits 220 an RF signal, $RF_1$, comprising $t_D$ to the vehicle 104 over the secure communication channel.

The control unit 110 of the vehicle 104 thereby receives 222 the response signal $US_2$, verify $ID_2$, and create a time stamp $t_4$ upon reception of the signal $US_2$. That $ID_2$ is verified means that it is determined that $ID_2$ is a valid ID originating from the user device 102, and derived from the ultrasound signal identity $ID_1$, based on that the previously agreed upon method for creating $ID_2$ is known by the vehicle 104. It is also possible to encode only a truncated version of $ID_2$ in the ultrasound signal $ID_2$, and to send the complete $ID_2$ in the RF signal $RF_1$. This can for example be advantageous for long IDs, since large amounts of information is more easily encoded in RF signals compared to in ultrasound signals. Either way, $ID_2$ is received by the vehicle 104 which is then able to verify that the time stamp $t_4$ corresponds to a signal $US_2$ received from the user device 102, based on the originally transmitted signal $US_1$.

The signal $RF_1$ transmitted by the user device 102 may also comprise $ID_1$, thereby allowing the vehicle 104 to verify that $ID_1$ has been received by the user device 102 without being corrupted.

Furthermore, the RF signal $RF_1$ comprising $t_D$, and optionally the complete $ID_2$, is received 224 by the vehicle 104. The vehicle 104 can then determine 226 a second time-of-flight $ToF_2$ as $ToF_2=t_4-t_0-t_D$. The second time of flight $ToF_2$ should thus correspond to the time of flight of the reflected signal $US_1$. To be able to correctly determine $ToF_2$ the vehicle must have knowledge of the delay in the user device to, which is transmitted over the secure channel.

Accordingly, in a final step, $ToF_1$ is compared with $ToF_2$ and if a difference between $ToF_1$ and $ToF_2$ is below a predetermined threshold value $T_{max}$, the user device is authorized 228.

The threshold value $T_{max}$ is preferably larger than the combined measurement inaccuracies in the vehicle 104 and the user device 102. Accordingly, the threshold value $T_{max}$ may thus be set for a particular combination of vehicle 104 and user device 102, or for a combination covering many different vehicles 104 and user devices 102.

If the difference between $ToF_1$ and $ToF_2$ exceeds threshold value $T_{max}$, this can be interpreted as a potential relay station attack, and at this point the vehicle 104 will not authorize a service request from the user device 102. The service request can be explicitly communicated by the user device 102 via the secure radio channel, but it can also be an implicit request, such as an implicit request to unlock the vehicle 104 when the user device 102 is within a maximum distance from the vehicle 104.

When the authorization fails, a new attempt can be carried out by the user device 102 again detecting an ultrasound signal transmitted by the vehicle 104, and performing the steps above for the vehicle 104 to again calculate $ToF_1$ and $ToF_2$ for comparison. If the renewed authentication and verification process then succeeds, the vehicle 104 may authorize the request from the user device 102, or it may have a policy to require more than one successful verification after a failed authorization before granting the request. In the case of several failed authorization attempts, the vehicle 104 may have a policy to prevent setting up a secure communication channel to this user device 102, and thereby aborting any requests from the user device 102, possibly for a set time period. The vehicle 104 may in this case also report the failed authorization via other communication channels to its owner, or some other recipient.

Various additional safeguards may be implemented to further increase the difficulty for an attacker attempting a physical layer relay attack.

Figure 4:
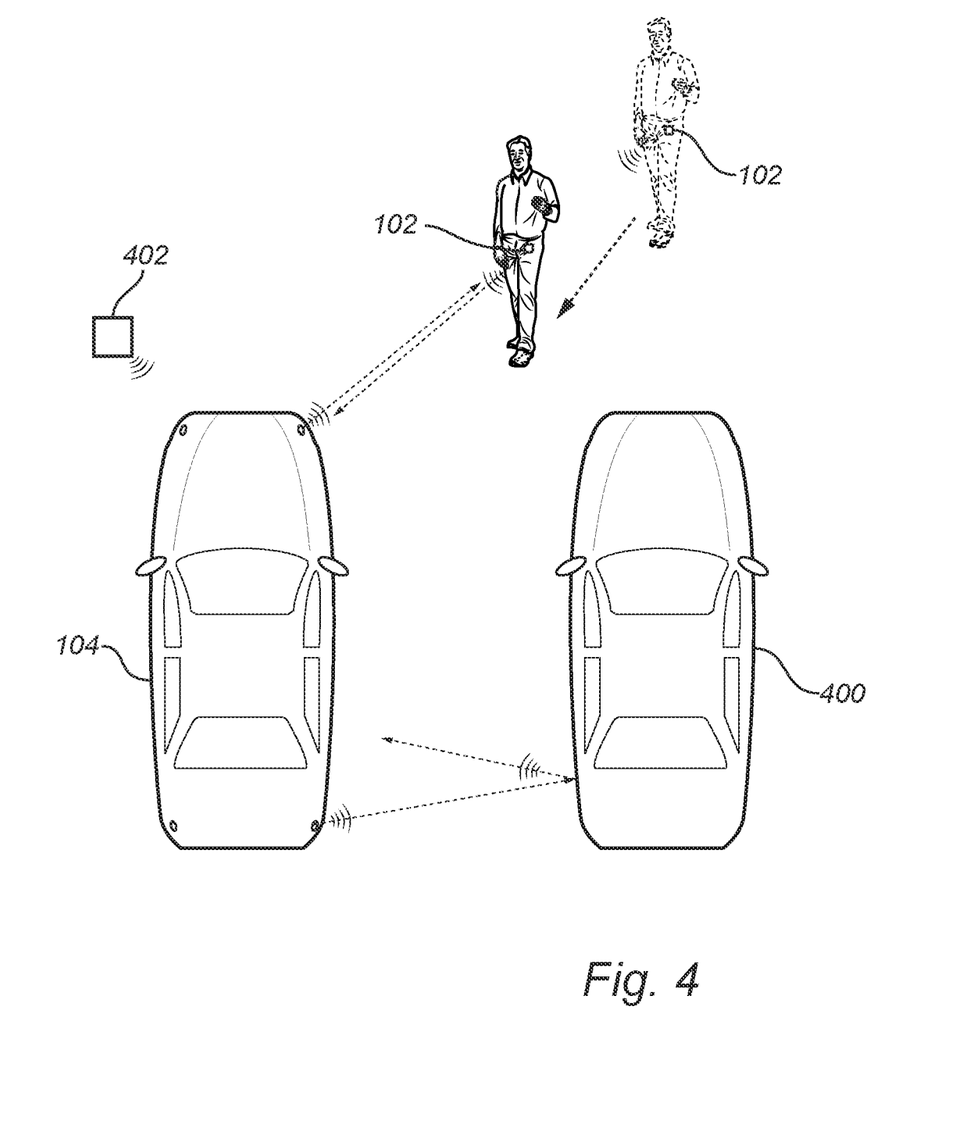
FIG. 4 schematically illustrates an example user device of a system according to an embodiment of the invention.

FIG. 4 schematically illustrates an example where a plurality of objects are located in the vicinity of the vehicle 104 resulting in a plurality of reflected signals. The vehicle 104 then creates a corresponding plurality of time stamps $t_{11}, \ldots, t_{1N}$, where N represent the number of received reflected signals, upon reception of each reflected signal. For each received reflected ultrasound signal, a corresponding first time-of-flight $ToF_{11}, \ldots, ToF_{1N}$, is determined as $ToF_{11}, \ldots, ToF_{1N}=t_{11}-t_0, \ldots, t_{1N}-t_0$ such that each of $ToF_{11}$ to $TOF_{1N}$ can be compared with the second time of flight $ToF_2$. Thereby, if a difference between any one of $ToF_{11}, \ldots, ToF_{1N}$, and $ToF_2$ is below the predetermined threshold value $T_{max}$, the user device can be authorized.

The adjacent objects may for example be an adjacent vehicle 400 or an attack device 402 used to intercept signals between the vehicle 104 and the user device 102 to perform a physical layer relay attack. Accordingly, to further reduce the risk of a successful attack, an authorization can be prevented or revoked if any detected object is closer to the vehicle 104 than the user device 102. The distance to the user device 102 can be determined based on $ToF_2$ which in turn can be determined based on knowledge of the response delay time $t_D$.

Figure 5:
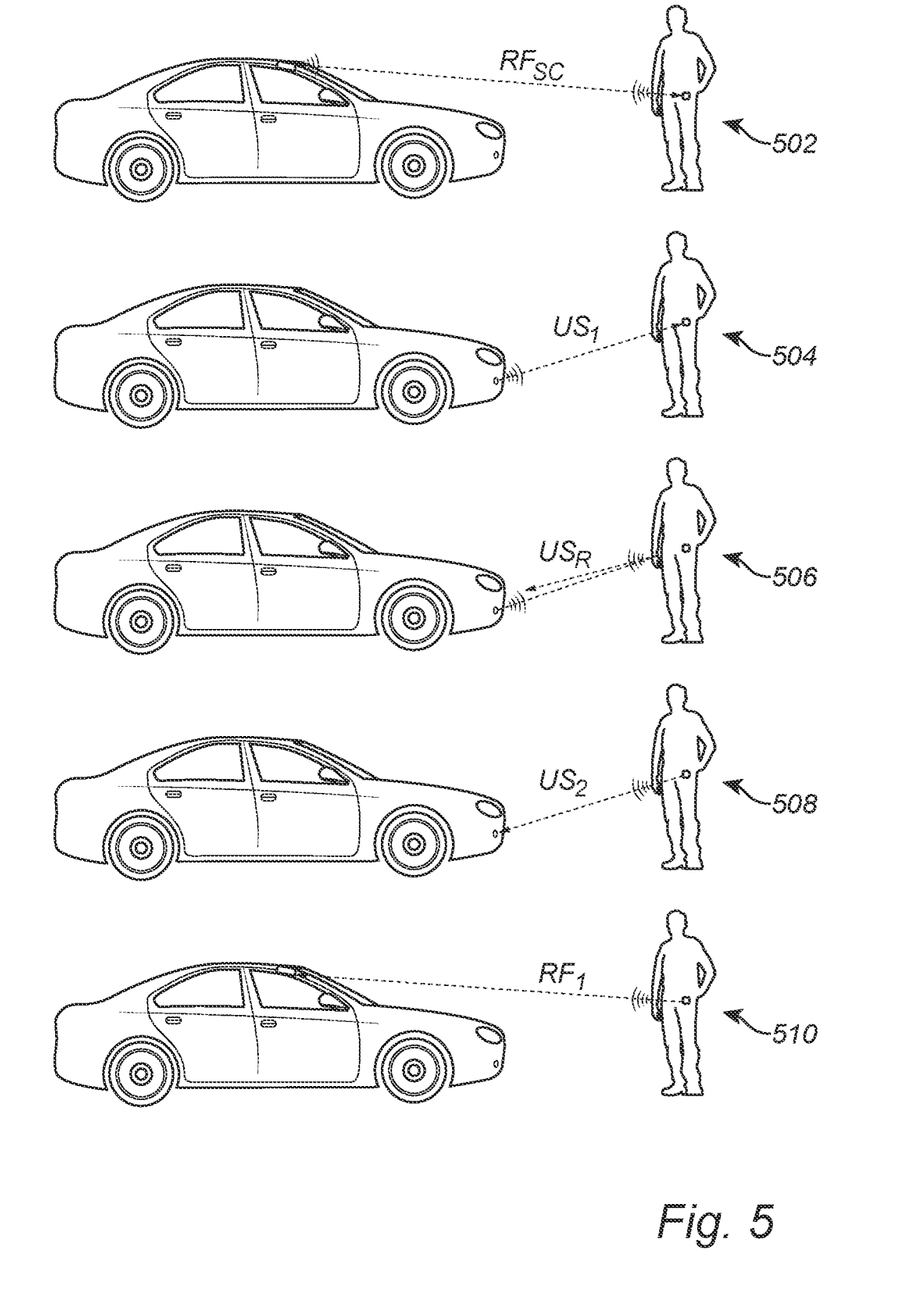
FIG. 5 schematically illustrates an example user device of a system according to an embodiment of the invention.

FIG. 5 schematically illustrates the general steps of an embodiment of the invention illustrating the signaling between the user device 102 and the vehicle 104.

First, in 502, a secure RF communication channel $RF_{SC}$ is established. Next 504, an ultrasound signal $US_1$ is transmitted from the vehicle 104 and the transmitted signal is subsequently reflected 506 in an object at a location determined to correspond to the location of the user device 102. In 508, a response signal $US_2$ is generated in the user device 102 and transmitted to the vehicle 104. Finally, in 510, an RF signal $RF_1$ is transmitted from the user device 102 to the vehicle 104 over the secure communication channel.

Even though the invention has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A method, comprising:
   establishing a secure communication channel between a vehicle and a user device;
   transmitting an acoustic signal comprising a first unique identity from a vehicle acoustic transducer and creating a first time stamp;
   in the vehicle, receiving at least one reflected acoustic signal and creating a second time stamp upon reception, and, for the at least one reflected acoustic signal, determining a first time-of-flight;
   in the user device, receiving and verifying the first unique identity transmitted by the vehicle and creating a third time stamp upon reception, generating a response signal using a previously agreed upon method for creating a second unique identity based on the received first unique identity, transmitting the response signal as an acoustic signal comprising the second unique identity and creating a fourth time stamp for the transmission event, determining a response delay time, and transmitting a radio frequency (RF) signal comprising the response delay time to the vehicle over the secure communication channel;

in the vehicle, receiving the response signal, verifying the second unique identity and creating a fifth time stamp, receiving the RF signal comprising the response delay time, and determining a second time-of-flight; and when a difference between the first time-of-flight and the second time-of-flight is below a predetermined threshold value, authorizing the user device to send a request to the vehicle.

2. The method of claim 1, further comprising:

transmitting the acoustic signal comprising the first unique identity $ID_1$ from the vehicle acoustic transducer and creating the first time stamp $t_0$;

in the vehicle, receiving the at least one reflected acoustic signal and creating the second time stamp $t_1$ upon reception, and, for the at least one reflected acoustic signal, determining the first time-of-flight $ToF_1=t_1-t_0$;

in the user device, receiving and verifying the first unique identity $ID_1$ transmitted by the vehicle and creating the third time stamp $t_2$ upon reception, generating the response signal using the previously agreed upon method for creating the second unique identity $ID_2$ based on the received first unique identity $ID_1$, transmitting the response signal as the acoustic signal comprising the second unique identity $ID_2$ and creating the fourth time stamp $t_3$ for the transmission event, determining the response delay time $t_D=t_3-t_2$, and transmitting the RF signal comprising the response delay time $t_D$ to the vehicle over the secure communication channel;

in the vehicle, receiving the response signal, verifying the second unique identity $ID_2$ and creating the fifth time stamp $t_4$, receiving the RF signal comprising the response delay time $t_D$, and determining the second time-of-flight $ToF_2=t_4-t_0-t_D$; and when the difference between $ToF_1$ and $ToF_2$ is below the predetermined threshold value $T_{max}$, authorizing the user device to send the request to the vehicle.

3. The method of claim 2, wherein the steps after establishing the secure communication channel between the vehicle and the user device are performed repeatedly.

4. The method of claim 3, further comprising, when the difference between $ToF_1$ and $ToF_2$ is above the predetermined threshold value $T_{max}$, denying authorization of the user device to send the request to the vehicle.

5. The method of claim 2, further comprising, in the vehicle, receiving a plurality of reflected signals, creating a corresponding plurality of time stamps $t_{11}, \ldots, t_{1N}$ upon reception of each of the plurality of reflected signals, for each of the plurality of reflected signals determining a first time-of-flight $ToF_{11}, \ldots, ToF_{1N}=t_{11}-t_0, \ldots, t_{1N}-t_0$, and when a difference between any one of $ToF_{11}, \ldots, TOF_{1N}$, and $ToF_2$ is below the predetermined threshold value $T_{max}$, authorizing the user device to send the request to the vehicle.

6. The method of claim 5, further comprising, when an object is detected which is closer to the vehicle than the user device which is to be authorized, denying the authorization.

7. The method of claim 2, wherein the previously agreed upon method for creating the second unique identity $ID_2$ comprises using one or more of a predetermined algorithm, a secure key, a shared secret, and an algorithm and secret data exchanged over the secure communication channel.

8. The method of claim 1, wherein the response delay time is a random time within a predetermined range.

9. The method of claim 1, wherein establishing the secure communication channel comprises broadcasting a Bluetooth signal from the vehicle.

10. The method of claim 1, wherein transmitting the acoustic signal from the vehicle acoustic transducer is done based on a request from the user device.

11. A system, comprising:

a vehicle comprising a vehicle acoustic transducer and a vehicle radio frequency (RF) transceiver;

a user device comprising a user device acoustic transducer and a user device RF transceiver; and a vehicle control unit configured to:
establish a secure communication channel between the vehicle and the user device,
activate the vehicle acoustic transducer to transmit an acoustic signal comprising a first unique identity and create a first time stamp,
receive at least one reflected acoustic signal and create a second time stamp upon reception, and
for the at least one reflected acoustic signal, determine a first time-of-flight;

wherein the user device is configured to:
receive and verify the first unique identity transmitted by the vehicle and create a third time stamp upon reception,
generate a response signal using a previously agreed upon method for creating a second unique identity based on the first unique identity,
transmit the response signal as an acoustic signal comprising the second unique identity and create a fourth time stamp for the transmission event,
determine a response delay time, and
transmit an RF signal comprising the response delay time to the vehicle over the secure communication channel;

wherein the vehicle control unit is further configured to:
receive the response signal, verify the second unique identity, and create a fifth time stamp,
receive the RF signal comprising the response delay time, and
determine a second time-of-flight; and
when a difference between the first time-of-flight and the second time-of-flight is below a predetermined threshold value, the system is configured to authorize the user device to send a request to the vehicle.

12. The system of claim 11, wherein the vehicle control unit is configured to:
activate the vehicle acoustic transducer to transmit the acoustic signal comprising the first unique identity $ID_1$ and create the first time stamp $t_0$,
receive the at least one reflected acoustic signal and create the second time stamp $t_1$ upon reception, and
for the at least one reflected acoustic signal, determine the first time-of-flight $ToF_1=t_1-t_0$;

wherein the user device is configured to:
receive and verify the first unique identity $ID_1$ transmitted by the vehicle and create the third time stamp $t_2$ upon reception,
generate the response signal using the previously agreed upon method for creating the second unique identity $ID_2$ based on the first unique identity $ID_1$,
transmit the response signal as the acoustic signal comprising the second unique identity $ID_2$ and create the fourth time stamp $t_3$ for the transmission event,
determine the response delay time $t_D=t_3-t_2$, and
transmit the RF signal comprising the response delay time $t_D$ to the vehicle over the secure communication channel;

wherein the vehicle control unit is further configured to:
  receive the response signal, verify the second unique identity $ID_2$, and create the fifth time stamp $t_4$,
  receive the RF signal comprising the response delay time $t_D$, and
  determine the second time-of-flight $ToF_2 = t_4 - t_0 - t_D$; and
  when the difference between $ToF_1$ and $ToF_2$ is below the predetermined threshold value $T_{max}$, the system is configured to authorize the user device to send the request to the vehicle.

13. The system of claim 12, wherein the system is further configured to, when the difference between $ToF_1$ and $ToF_2$ is above the predetermined threshold value $T_{max}$, denying authorization of the user device to send the request to the vehicle.

14. The system of claim 12, wherein the previously agreed upon method for creating the second unique identity $ID_2$ comprises using one or more of a predetermined algorithm, a secure key, a shared secret, and an algorithm and secret data exchanged over the secure communication channel.

15. The system of claim 11, wherein the vehicle comprises one acoustic transducer arranged in each corner of the vehicle, wherein each transducer has a horizontal directional sensitivity of at least 270° and a vertical directional sensitivity of at least 180°.

16. The system of claim 11, wherein the acoustic transducer in the vehicle is part of a proximity detection system of the vehicle.

17. The system of claim 11, wherein the user device is one of a car key, a key fob, and a smartphone.

18. The system of claim 11, wherein the acoustic transducer in either or both of the user device and the vehicle comprises a separate transmitter module and a separate receiver module.

19. The system of claim 11, wherein the response delay time is a random time within a predetermined range.

20. The system of claim 11, wherein establishing the secure communication channel comprises broadcasting a Bluetooth signal from the vehicle.

21. The system of claim 11, wherein transmitting the acoustic signal from the vehicle acoustic transducer is done based on a request from the user device.

* * * * *